(12) United States Patent
Kumon

(10) Patent No.: US 8,573,864 B2
(45) Date of Patent: Nov. 5, 2013

(54) IMAGE PICKUP APPARATUS HAVING FIRST AND SECOND TIMERS

(75) Inventor: Sayaka Kumon, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 13/210,035

(22) Filed: Aug. 15, 2011

(65) Prior Publication Data

US 2012/0045195 A1    Feb. 23, 2012

(30) Foreign Application Priority Data

Aug. 20, 2010 (JP) ................. 2010-185423

(51) Int. Cl.
*G03B 19/12* (2006.01)
(52) U.S. Cl.
USPC ........................................ 396/358
(58) Field of Classification Search
USPC ........................................ 396/354, 358, 447
See application file for complete search history.

(56) References Cited

U.S. PATENT DOCUMENTS

| | | | | |
|---|---|---|---|---|
| 4,103,307 A | * | 7/1978 | Shinoda et al. | 396/227 |
| 4,816,851 A | * | 3/1989 | Fukahori et al. | 396/406 |
| 4,914,465 A | * | 4/1990 | Saegusa et al. | 396/213 |
| 5,459,511 A | * | 10/1995 | Uehara et al. | 348/335 |
| 6,188,848 B1 | * | 2/2001 | Takahashi | 396/315 |

FOREIGN PATENT DOCUMENTS

JP    2000-137287    5/2000

* cited by examiner

*Primary Examiner* — Clayton E Laballe
*Assistant Examiner* — Warren K Fenwick
(74) *Attorney, Agent, or Firm* — Cowan, Liebowitz & Latman, P.C.

(57) ABSTRACT

An image pickup apparatus includes a first timer configured to start measuring a first time period when a mirror located at a mirror-up position is moved to a mirror-down position, a second timer configured to start measuring a second time period when the mirror reaches the mirror-down position, and a controller configured to enable processing when the first timer finishes measuring the first period and the second timer finishes measuring the second period. The first period is a time period enough to attenuate mirror's bounds after the mirror located at the mirror-up position starts moving to the mirror-down position, when a high power-supply voltage is set to the image pickup apparatus, and the second period is a time period enough to attenuate mirror's bounds after the mirror reaches the mirror-down position, when a low power-supply voltage is set to the image pickup apparatus.

6 Claims, 6 Drawing Sheets

IMAGE PICKUP APPARATUS HAVING FIRST AND SECOND TIMERS

BACKGROUND OF THE INVENTION

1. Field of the Invention

The present invention relates to an image pickup apparatus.

2. Description of the Related Art

Photometry and focus detection are started after mirror-down driving is completed in a single-lens reflex camera. In order to improve the precisions of the photometry and focus detection, they need to start after mirror's bounds sufficiently attenuate. However, it is difficult to directly detect the mirror's bounding state, and prior art start the photometry and focus detection when a time period passes which is assumed sufficient to attenuate the mirror's bounds after mirror-down driving starts (Japanese Patent Laid-Open No. 2000-137287).

A time period within which the mirror's bounds sufficiently attenuate regardless of a state of a camera is set to the above time period from when the mirror-down driving starts to when the mirror's bounds attenuate. However, the time period enough to attenuate the mirror's bounds varies according to the power-supply voltage of the camera or the environmental temperature used for the camera.

For example, a time period enough to sufficiently attenuate the camera's bounds needs to be set to a camera in which the power-supply voltage of the camera is the lowest operable voltage of the camera. Hence, as the power-supply voltage of the camera becomes higher, it is necessary to wait for a set time period although the mirror bounds have already attenuated, deteriorating a consecutive shooting speed (frame rate).

SUMMARY OF THE INVENTION

The present invention provides an image pickup apparatus which does not need to wait for a set time period when mirror's bounds have attenuated, and which can improve consecutive shooting speed (frame rate) in consecutive shooting.

An image pickup apparatus according to one aspect of the present invention includes a mirror configured to have one of a mirror-down state and a mirror-up state, a driver configured to drive the mirror, a processor configured to provide processing utilizing incident light when the mirror is in the mirror-down state, a first timer configured to start measuring a first preset time period when the driver starts driving the mirror in the mirror-up state to the mirror-down state, a detector configured to detect that the mirror is in the mirror-down state by the driver, a second timer configured to start measuring a second preset time period when the detector detects that the mirror reaches the mirror-down state, and a controller configured to make the processor execute the processing when the first timer finishes measuring the first period and the second timer finishes measuring the second period. The first period is a time period enough to attenuate bounds of the mirror after the mirror in the mirror-up state starts turning to the mirror-down state, when a power-supply voltage of the image pickup apparatus is a first voltage and when the driver starts turning the mirror from the mirror-up state to the mirror-down state. The second period is a time period enough to attenuate bounds of the mirror after the mirror reaches the mirror-down state, when the power-supply voltage of the image pickup apparatus is a second voltage lower than the first voltage and when the driver starts turning the mirror from the mirror-up state to the mirror-down state.

Further features of the present invention will become apparent from the following description of exemplary embodiments with reference to the attached drawings.

DESCRIPTION OF THE EMBODIMENTS

Figure 1:
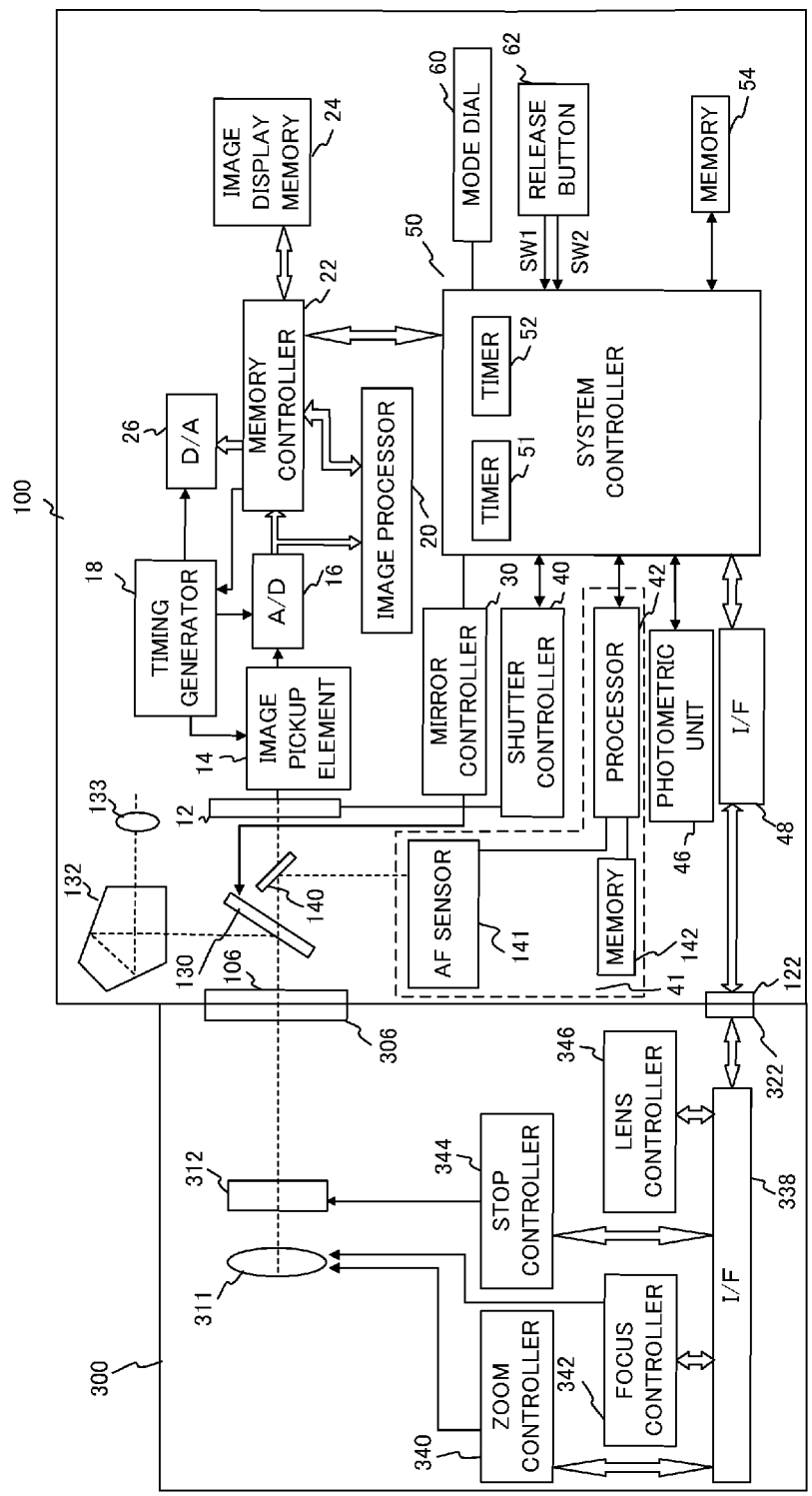
FIG. 1 is a block diagram of a mirror-down state of an image pickup apparatus.
Figure 2:
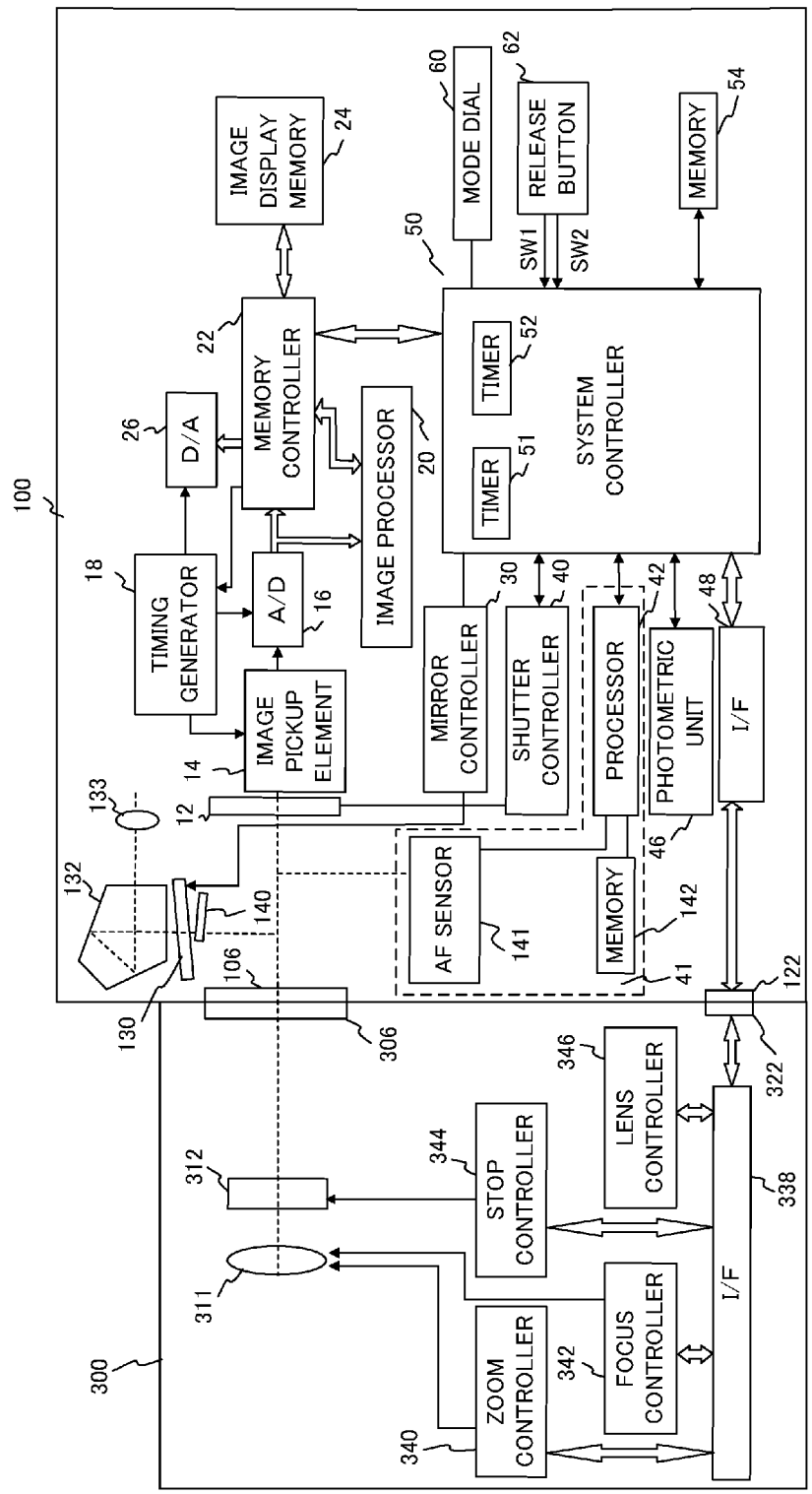
FIG. 2 is a block diagram of a mirror-up state of an image pickup apparatus.

FIGS. 1 and 2 are block diagrams of an image pickup apparatus, such as a digital single-lens reflex lens, of a lens exchange type.

The image pickup apparatus includes a camera body 100, and a lens unit 300 that is exchangeably attached to the camera body 100.

In the lens unit 300, reference numeral 311 denotes an image pickup lens including one or more focus lenses used for focusing on an object. The focus lens is configured to move in the optical axis direction. Reference numeral 312 denotes a stop.

Reference numeral 322 denotes a connector used to electrically connect the lens unit 300 to a connector 122 of the camera body 100. Reference numeral 338 denotes an interface used to connect the lens unit 300 with the connector 122 of the camera body 100. Reference numeral 340 denotes a zoom controller of the image pickup lens 311. Reference numeral 342 denotes a focus controller of the image pickup lens 311. Reference numeral 346 denotes a lens system controller configured to control the entire lens unit 300.

In FIG. 1, a main mirror 130 and a sub-mirror 140 are in the mirror-down states. Each of the main mirror 130 and the sub-mirror 140 corresponds to a mirror that can have a mirror-down state or a mirror-up state. FIG. 1 illustrates that light from an object enters the main mirror 130 through the image pickup lens 311, the stop 312, and the lens mounts 306 and 106.

Part of the light from the object is reflected on the main mirror 130, and led to a penta-prism 132, in which the object image is inverted and led to an ocular lens 133. The light from the object reflected on the main mirror 130 enters a photometric unit 46. Part of the main mirror 130 is a half-mirror, and part of the light from the object passes the main mirror 130 and enters the sub-mirror 140.

The sub-mirror 140 is a total reflection mirror, and the light reflected on the sub-mirror 140 enters an AF sensor 141 of a focus detection unit 41. Each of the photometric unit 46 and the focus detection unit 41 corresponds to a processor configured to provide processing utilizing incident light.

In FIG. 2, the main mirror 130 and the sub-mirror 140 are in the mirror-up state. In FIG. 2, the light from the object is led to the shutter 12 through the image pickup lens 311, the stop 312, the lens mounts 306 and 106. When the shutter 12 moves, the light from the object enters an image pickup element 14.

In the state illustrated in FIG. 2, the main mirror 130 and the sub-mirror 140 retreat to the outside of an optical path, and thus the light from the object is not led to the penta-prism 132 and the ocular lens 133. When the main mirror 130 and the sub-mirror 140 are in the mirror-up state, the light from the object does not enter the photometric unit 46 or the AF sensor 141.

The image pickup element 14 photometrically converts the light from the object, and generates image data. Reference numeral 16 denotes an A/D converter configured to convert an analogue signal output into a digital signal (image data). Reference numeral 18 denotes a timing generator configured to supply a clock signal or a control signal to the image pickup element 14, an A/D converter 16, and a D/A converter 26, and is controlled by a memory controller 22 and a system controller 50.

Reference numeral 20 denotes an image processor configured to provide pixel interpolation processing and color conversion processing for the image data from the memory controller 22 or from the A/D converter 16. The image processor 20 provides calculation processing using the image data, and the system controller 50 controls the shutter controller 40, focus detection processing of a contrast detection method, auto-exposure processing, and flash pre-emission processing based on the obtained calculation result.

The memory controller 22 controls the A/D converter 16, the timing generator 18, the image processor 20, the image display memory 24, and the D/A converter 26. The image data for display written down by the image display memory 24 is displayed on an image display (not illustrated) arranged on the back of the camera via the D/A converter 26.

Reference numeral 30 denotes a mirror controller configured to move the main mirror 130 and the sub-mirror 140 between the mirror-down positions illustrated in FIG. 1 and the mirror-up positions illustrated in FIG. 2. The mirror controller 30 is controlled by the system controller 50.

A stop controller 344 controls opening and closing of the stop 312 based on photometry information from the photometric unit 46. The shutter controller controls opening and closing of the shutter 12 in accordance with an instruction from the system controller 50.

Reference numeral 48 denotes an interface configured to connect the camera body 100 with the lens unit 300 with the lens mount 106, and reference numeral 122 denotes a connector configured to electrically connect the camera body 100 with the lens unit 300.

The focus detector 41 provides a focus detection of a phase difference method, and includes a processor 42, an AF sensor 141, and a memory 142.

The focus detection of the phase difference method detects a focus state of the image pickup lens based on a shift amount (phase difference) between a pair of optical images obtained from a pair of re-imaging optical systems. The processor 42 calculates an in-focus state of the object image (optical image) of the AF sensor 141, and outputs a focusing signal by detecting focuses for a plurality of focus detecting fields. The system controller 50 evaluates a calculation result, and instructs the focus controller 342 to control driving of the image pickup lens 311.

The memory 142 constructs a focus memory configured to store a detection result.

The camera body 100 includes a contrast focus detector (not illustrated) configured to provide a focus detection of a contrast method utilizing a contrast component of the image data obtained from the image processor 20. The focus detection of the contrast method utilizes a (mountain-climbing) method by which a position of the image pickup lens 311 corresponding to a contrast peak can be searched for by moving the image pickup lens 311.

The photometric unit 46 measures brightness of the object, executes an auto-exposure, and performs flash pre-emission processing in association with the flash 48.

The system controller 50 controls the entire camera body 100, and includes two built-in timers 51 and 52. The timer 51 starts measuring time when electrification to the motor 35 is started for mirror-down driving. The timer 52 starts measuring time when mirror-down driving is just completed (or the electrification to the motor 35 is just stopped).

The timer 51 corresponds to a first timer, and is configured to start measuring a first preset time period when mirror-down driving for the main mirror 130 and the sub-mirror 140 located at the mirror-up positions are started. The timer 52 corresponds to a second timer, and is configured to start measuring a second preset time period when the main mirror 130 and the sub-mirror 140 are detected to have reached their mirror-down positions.

Reference numeral 54 denotes a memory configured to store a constant, a variable, a program, etc. used for a variety of operations of the system controller 50. The system controller 50 provides focusing by moving the image pickup lens 311 based on a detection result of the focus detector 41.

Reference numeral 60 is a mode dial switch (mode setting unit) configured to set a variety of functional modes, such as power-off, an automatic shooting mode, a manual shooting mode, a panorama shooting mode, a macro shooting mode, a reproduction mode, a multi-screen reproduction/deletion mode, and a PC connection mode. The mode dial switch 60 can set, for example, a live view mode, a static image shooting mode, a consecutive shooting mode, or the like.

Reference numeral 62 denotes a release button as a two-stage switch. When the release button 62 is half-pressed, a first switch SW1 turns on and instructs a start of an action, such as AF processing and photometric processing. When the release button 62 is fully pressed, a second switch SW2 turns on and instructs commencements of a series of processing operations. The image-pickup related processing includes exposure processing, development processing, recording processing, and consecutive shooting.

The connector 122 communicates a control signal, a state signal, a data signal, etc. between the camera body 100 and the lens unit 300, and serves to supply currents of various types of voltages.

Figure 3A:
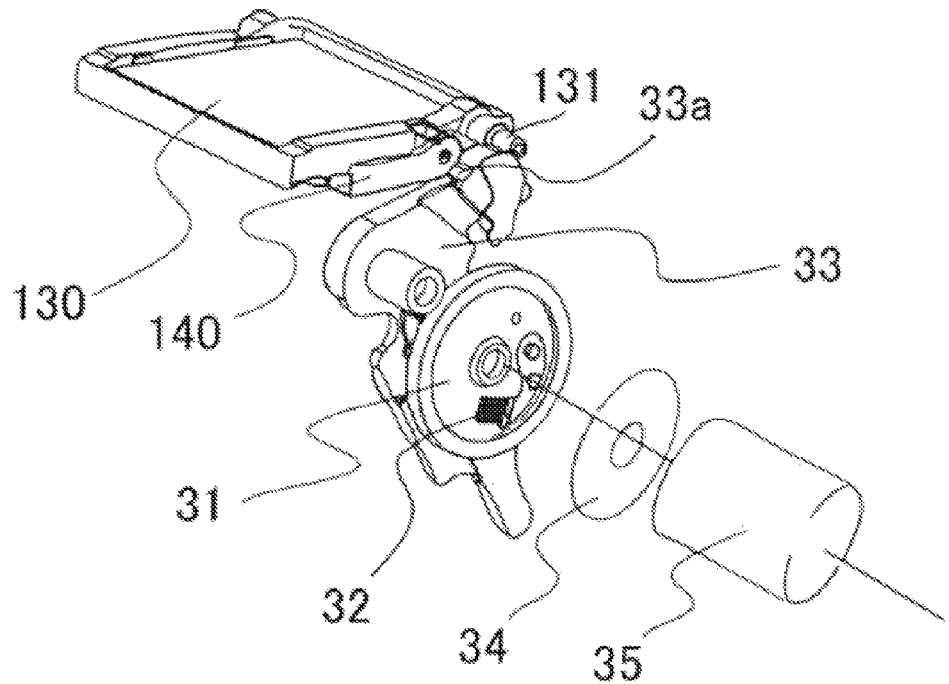
FIG. 3A is a partial perspective view of the mirror-up state of a mirror driving unit of a mirror controller illustrated in FIG. 2.
Figure 3B:
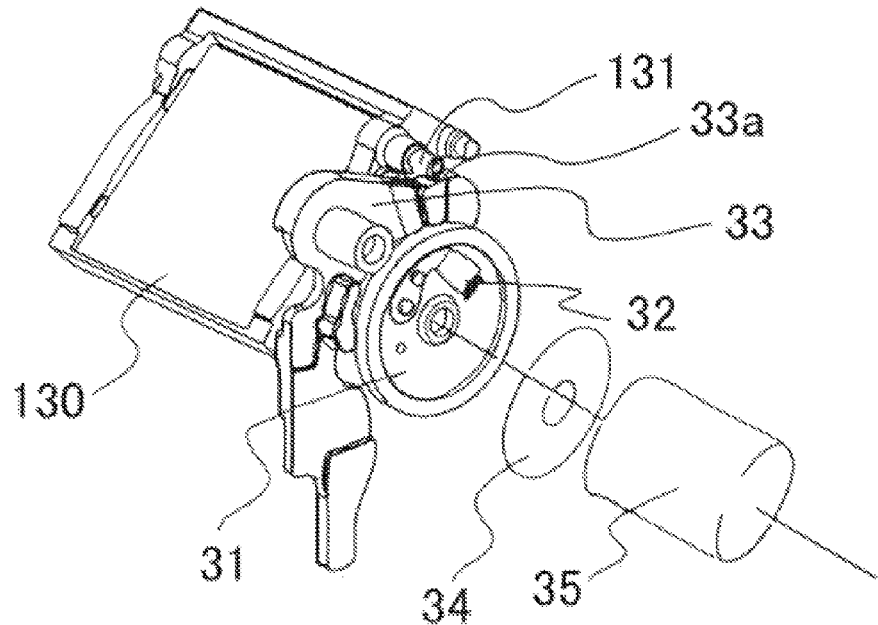
FIG. 3B is a partial perspective view of the mirror-down state of a mirror driving unit of a mirror controller illustrated in FIG. 1.

FIGS. 3A and 3B illustrate a structure of the mirror controller 30. FIG. 3A is a perspective view of a state of the mirror controller 30 when the mirror-up driving is completed as illustrated in FIG. 2. FIG. 3B is a perspective view of a state of the mirror controller 30 when the mirror-down driving is completed as illustrated in FIG. 1.

The mirror controller 30 includes, as illustrated in FIGS. 3A and 3B, a gear 31, a phase detecting section 32, a driving lever 33, a phase detecting substrate 34, and a motor 35. The motor 35 corresponds to a driver configured to drive the mirror.

When driving of the motor 35 is controlled by the system controller 50 from the mirror-up state illustrated in FIG. 3A, the gear 31 is rotationally driven by the motor 35. As the motor 35 rotates, the driving force is transmitted to the gear 31 and rotates the gear 31 in one direction. The phase detecting section 32 fixed onto the gear 31 moves on the pattern of the phase detecting substrate 34.

The rotation of the gear 31 is transmitted to the driving lever 33, and the driving lever 33 rotates clockwise as illustrated in FIG. 3A. The driving lever includes a contact portion 33a that contacts a driving pin 131 of the main mirror 130. As the driving lever 33 rotates, the driving pin 131 follows a contour of the contact portion 33a, providing the mirror-down state illustrated in FIG. 3B.

Figure 4A:
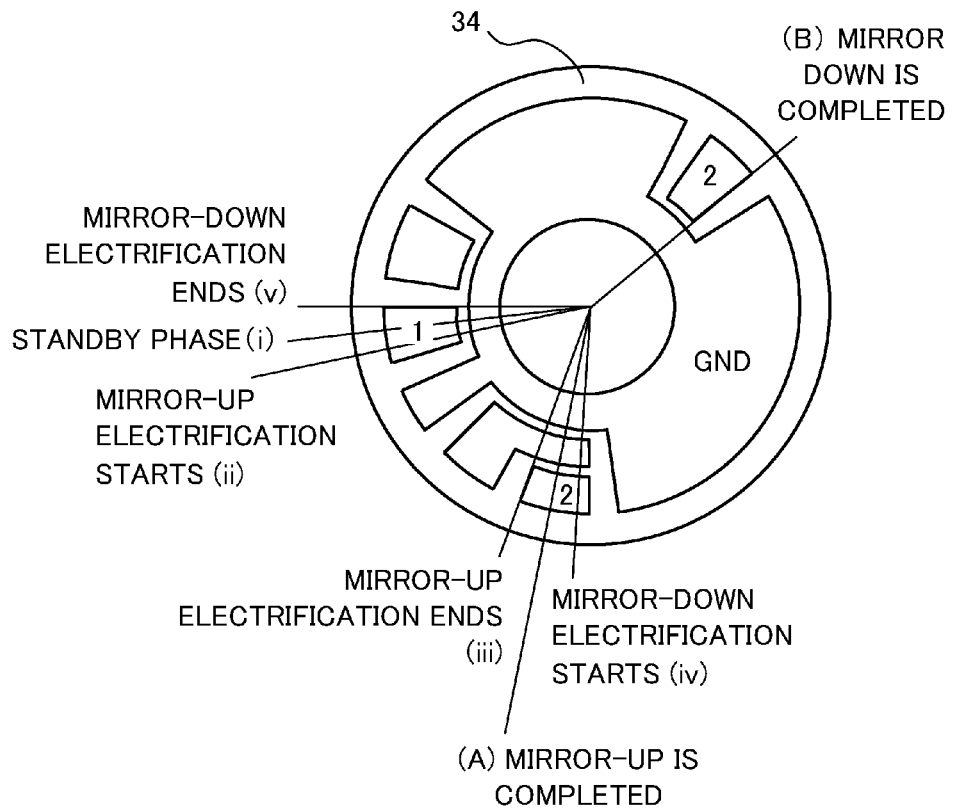
FIG. 4A is a plane view of a phase detecting substrate illustrated in FIGS. 3A and 3B.
Figure 4B:
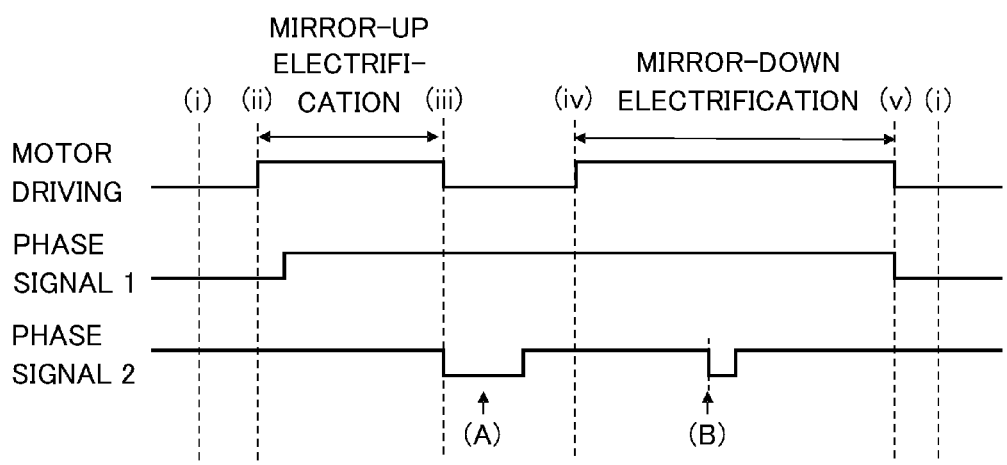
FIG. 4B is a timing chart.

FIG. 4A is a plane view of the phase detecting substrate 34, and FIG. 4B is a timing chart of electrification timings to the motor 35 and the phase signal. Pattern 1 illustrated in FIG. 4A is an area that makes low the polarity of a phase signal 1 illustrated in FIG. 4B when the phase detecting section 32 is located on the pattern 1. Pattern 2 illustrated in FIG. 4A is an area that makes low the polarity of a phase signal 2 illustrated in FIG. 4B when the phase detecting section 32 is located on the pattern 2.

(A) in FIG. 4B is a phase that provides the mirror-up state illustrated in FIGS. 3A, and (B) in FIG. 4B is a phase that provides the mirror-down state illustrated in FIG. 3B. When detecting a release manipulation in which the release button 62 is pressed, the system controller 50 starts electrifying the motor 35 for mirror-up driving. At this time, a positional relationship between the phase detection section 32 and the phase detection substrate 34 provides a position (ii) in FIG. 4A.

As described above, as the motor 35 rotates, the driving force is transmitted to the gear 31, and rotates the gear 31 in one direction. The rotation of the gear 31 is transmitted to the driving lever 33, and the driving lever 33 rotates counterclockwise from the state illustrated in FIG. 3B. Thereby, the contact portion 33a of the driving lever 33 pushes the driving pin 131 of the main mirror 130.

At this time, the phase detecting section 32 fixed onto the gear 31 moves on the pattern of the phase detecting substrate 34. When a positional relationship between the phase detecting section 32 and the phase detecting substrate 34 provides a position (iii) in FIG. 4A, the polarity of the phase signal 2 from the phase detecting substrate 34 changes. When the polarity of the phase signal 2 changes, the system controller 50 stops a mirror-up electrification to the motor 35. Even after the motor 35 is stopped, the gear 31 is slightly rotated due to the inertia and thus when the main mirror 130 and the sub-mirror 140 are in the mirror-up state, a positional relationship between the phase detecting section 32 and the phase detecting substrate 34 provide the position (A) in FIG. 4A.

After the shutter 12 moves, the system controller 50 starts re-electrifying the motor 35 for mirror-down driving. At this time, the phase detecting section 32 is located at a position of (iv) in FIG. 4A.

When the mirror-down driving starts, the phase detecting section 32 moves counterclockwise from the position (iv) in FIG. 4A. When the main mirror 130 and the sub-mirror 140 reach the mirror-down positions, the phase detecting section 32 is located at the position (B) in FIG. 4A.

When the phase detecting section 32 is located at the position (B) in FIG. 4A, the polarity of the phase signal 2 from the phase detecting substrate 34 changes. When the system controller 50 detects that both the main mirror 130 and the sub-mirror 140 reach the mirror-down positions by detecting the polarity change of the phase signal 2. Thus, the phase detecting section 32 and the phase detecting substrate 34 correspond to a detector configured to detect that the mirror reaches the mirror-down position.

This embodiment continues to electrify the motor 35 even after the main mirror 130 and the sub-mirror 140 reach the mirror-down positions.

The phase detecting section 32 further moves counterclockwise from the position (B) in FIG. 4A, and when the phase detecting section 32 is located at the position (v) in FIG. 4A, the polarity of the phase signal 1 changes and the electrification to the motor 35 is stopped. Even after the motor 35 is stopped, the gear 31 slightly rotates due to the inertia. Thus, when the main mirror 130 and the sub-mirror 140 reach the mirror-down positions, the positional relationship of the phase detecting section 32 and the phase detecting substrate 34 provides a position (i) in FIG. 4A. At this time, the main mirror 130 and the sub-mirror 140 have the state illustrated in FIG. 3B.

Figure 5:
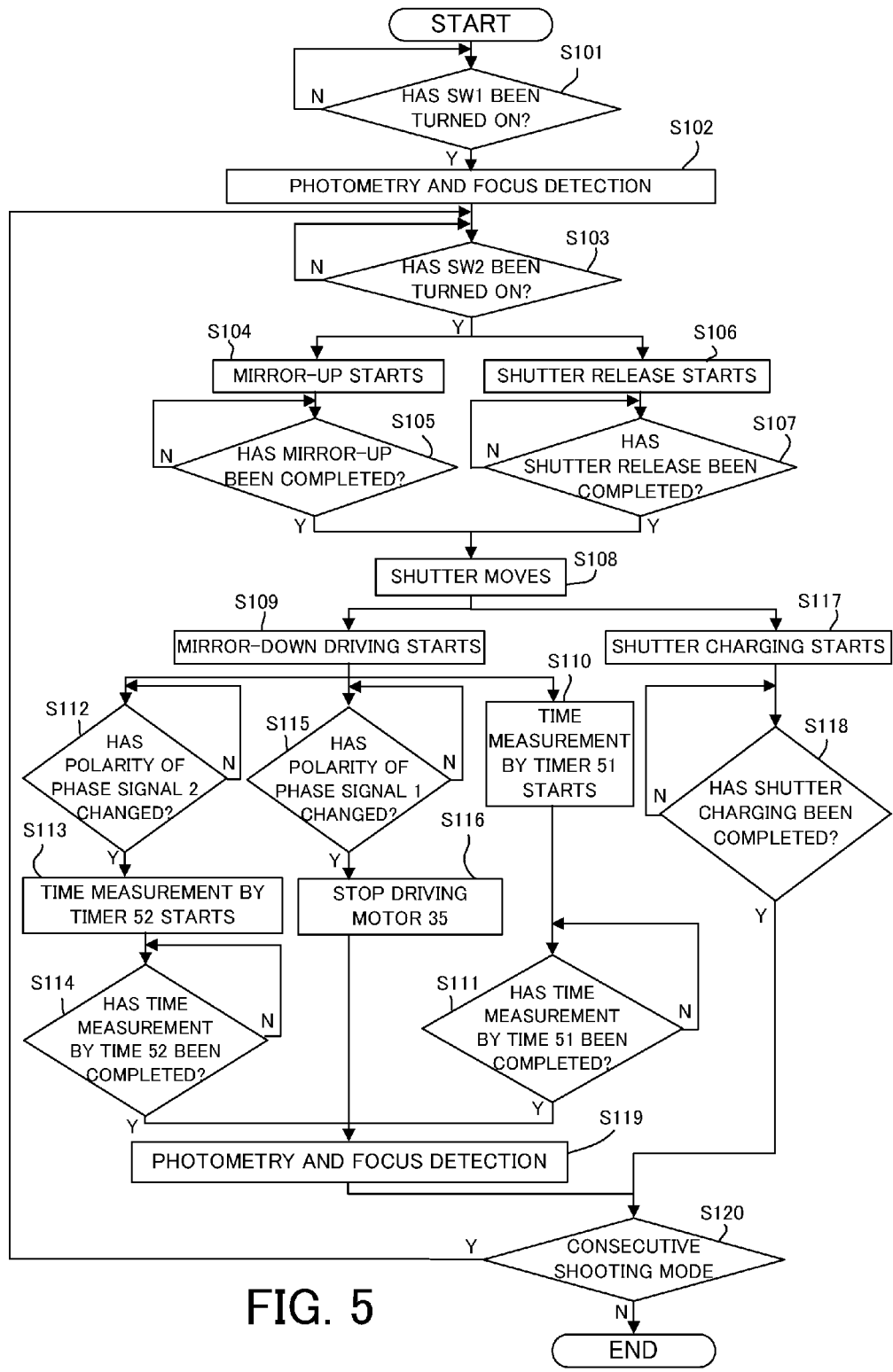
FIG. 5 is a flow diagram from when the image pickup apparatus illustrated in FIGS. 1 and 2 accepts an image pickup request to when an image pickup action is completed.

FIG. 5 is a flow diagram from when the image pickup apparatus illustrated in FIGS. 1 and 2 accepts an image pickup request to when an image pickup operation is completed. "S" stands for the step. In addition, "Y" means Yes, and "N" means No. The flow illustrated in FIG. 5 is performed in accordance with a computer program stored in the memory 54 by the system controller 50.

Initially, when the release button 62 is half-pressed and the SW1 turns on (Y of S101), the system controller 50 instructs the focus detector 41 to start the focus detection and the photometric unit 46 to start the photometry (S102).

Next, the system controller 50 controls the processor 42 to provide a focus detection of a phase difference method for an object image formed on the AF sensor 141. A detection result by the focus detector 41 is stored in the memory 142.

When the release button 62 is fully pressed and SW2 turns on (Y of S103) after the focus detection and the photometry end, the system controller 50 starts electrifying the motor 35. Thereby, mirror-up driving of the main mirror 130 and the sub-mirror 140 and the moving preparatory (shutter release) driving of the shutter 12 start (S104, S106). This mirror driving start position corresponds to the position (ii) in FIG. 4A.

Next, the system controller 50 determines based on the phase signal transmitted from the phase detecting substrate 34 whether the position (iii) in FIG. 4A is provided and thereby the mirror-up driving has been completed (S105). When the system controller determines that the mirror-up driving has been completed (Y of S105), the system controller 50 stops electrifying the motor 35. In addition, the system controller 50 controls the focus detector 342 based on the focus detection result, moves the focus lens in the image pickup lens 311, and provides autofocusing.

In S106, the system controller 50 starts electrifying a shutter motor (not illustrated) in the shutter controller 40. The electrification to the shutter motor releases a shutter curtain by a shutter charger for a transfer to the running preparatory state. In addition, the shutter controller 50 determines whether the shutter charger is moved to the shutter moving preparatory position and becomes ready to stop the shutter motor (S107). When determining so (Y of S107), the system controller 50 stops the shutter motor.

When the mirror-up driving is completed (Y of S105) and the shutter release is completed (Y of S107), the system controller 50 instructs the stop controller 344 to control the stop 312 based on the exposure control value corresponding to the photometric result of S102 so as to start moving the shutter curtain (S108). Thereby, static image photography is achieved.

After the shutter 12 moves (after S108), the system controller 50 electrifies the motor 35 so as to start mirror-down driving (S109). At this time, the phase detecting section 32 is located at the position (iv) in FIG. 4A.

When the mirror-down driving starts in S109, the timer 51 in the system controller 50 starts measuring time (S110). The system controller 50 determines whether the timer 51 finishes measuring the preset time period (S111).

The system controller 50 determines whether the mirror 130 and the sub-mirror 140 reach the mirror-down positions (or the position (B) in FIG. 4A) by determining a polarity change of the phase signal 2 (S112). When the polarity change of the phase signal 2 is detected and the main mirror 130 and the sub-mirror 140 reach the mirror-down positions (or the position (B) in FIG. 4A) in S112, the timer 52 in the system controller 50 starts measuring time (S113). The system controller 50 determines whether the timer 52 finishes measuring the preset time period (S114).

The system controller 50 determines whether the polarity change of the phase signal 1 is detected (S115). When detecting the phase change of the phase signal 1, the system controller 50 stops electrifying the motor 35 (S116).

When all conditions of Y of S111, Y of S114, and S116 are satisfied, the system controller 50 instructs the focus detector 41 to perform the focus detection and the photometric unit 46 to perform the photometry (S119). In other words, when driving of the motor 35 is stopped, the timer 51 finishes measuring time, and the timer 52 finishes measuring time, the system controller 50 executes the focus detection and the photometry. In other words, the system controller corresponds to a controller configured to enable processing by the processor when both of the time measurements by the first timer and the second timer are completed.

After the shutter 12 moves (after S108), the system controller 50 starts electrifying the shutter motor and starts shutter charging (S117). When determining that the shutter charging is completed (Y of S118), the shutter controller 50 stops electrifying the shutter motor.

When both conditions of Y of S118 and S119 are satisfied, the system controller 50 determines whether the mode dial switch 60 sets the consecutive shooting mode (S120). When the consecutive shooting mode is not set (N of S120), the system controller 50 ends the operation, and when the consecutive shooting mode is set (Y of S120), the flow returns to S103. In S103, when the release button 62 is not fully pressed, the system controller 50 determines that an image pickup end command is accepted, and ends the consecutive image pickup.

The first time period for the timer 51 is set to the conceivably shortest time period from when the electrification for the mirror-down driving starts to when the mirror's bounds attenuate. In other words, the first time period is set to a time period enough to attenuate the mirror's bounds after the mirror-down driving for the main mirror 130 and the sub-mirror 140 is started when the image pickup apparatus provides the mirror-down driving on favorable conditions. The image pickup apparatus provides the mirror-down driving on favorable conditions, when the power-supply voltage of the image pickup apparatus is first voltage that is relatively high, or the temperature of the image pickup apparatus is first temperature that is relatively high.

The second time period for the timer 52 is set to the conceivably longest time period from when the mirror-down driving is completed to when the mirror's bounds attenuate. In other words, the second time period is set to a time period enough to attenuate the mirror's bounds after the main mirror 130 and the sub-mirror 140 are moved to the mirror-down positions by the motor 35 when the image pickup apparatus provides the mirror-down driving on unfavorable conditions. The image pickup apparatus provides the mirror-down driving on unfavorable conditions, when the power-supply voltage of the image pickup apparatus is second voltage lower than the first voltage or the temperature of the image pickup apparatus is second temperature lower than the first temperature. The second time period is set smaller than the first time period.

Figure 6:
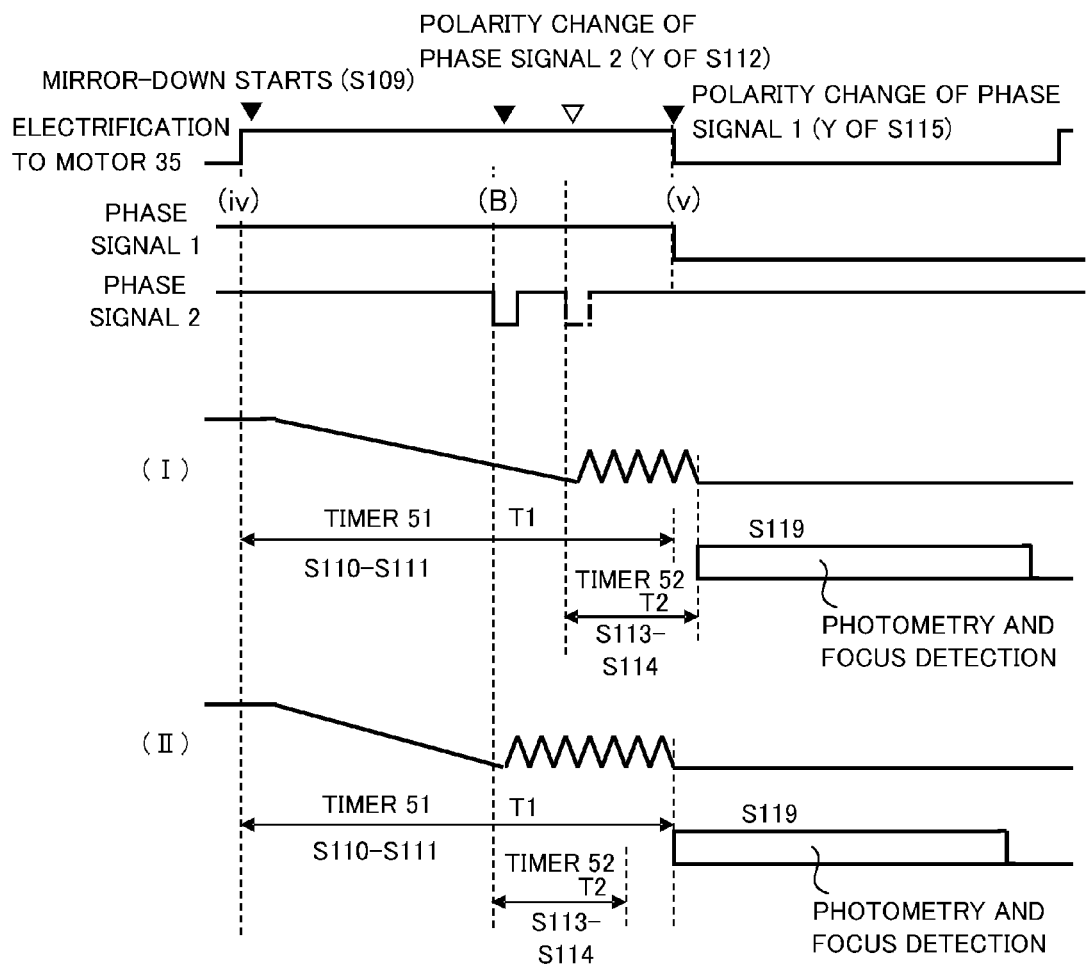
FIG. 6 is a timing chart of measurements of a pair of timers in a system controller at the mirror-down time.

FIG. 6 is a timing chart at the mirror-down time for the time measurements by the timer 51 and the timer 52. It schematically illustrates only the mirror-down portion after the mirror-down electrification starting position. FIG. 6(I) corresponds to the unfavorable conditions of the image pickup apparatus or the low mirror-down driving speed, for example, when the camera's power-supply voltage is low or when the camera is used in the low-temperature environment. Since the mirror-down driving speed is low in this case, an impact at the mirror-down time is small and a bound attenuating time period is relatively short. FIG. 6(II) corresponds to the favorable conditions of the image pickup apparatus or the high mirror-down driving speed, for example, when the camera's power-supply voltage is high or when the camera is used in the high-temperature environment. Since the mirror-down driving speed is high in this case, an impact at the mirror-down time is large and a bound attenuating time period is relatively long.

When the mirror-down driving speed is low as illustrated in FIG. 6(I), the time measurement (T2) by the time 52 is completed after the time measurement (T1) by the timer 51 is completed. On the other hand, when the mirror-down driving speed is high as illustrated in FIG. 6(II), the time measurement (T1) by the timer 51 is completed after the time measurement (T2) by the timer 52 is completed. Thus, even when the bound attenuating time period changes depending upon the mirror-down driving speed, bounds of the main mirror 130 and the sub-mirror 140 sufficiently attenuate when both the time measurements by the timer and the timer 52 are completed. Thus, the focus detection and photometry can be started after the mirror's bounds sufficiently attenuate. Since a time lag is reduced or eliminated from when the mirror's bounds attenuate to when the focus detection or photometry starts, the consecutive shooting speed (frame rate) can be improved in the consecutive shooting.

According to this embodiment, the timer 51 starts measuring time of the first time period when the electrification to the motor 35 is started to start the mirror-down driving, and the timer 52 starts measuring time of the second time period when the phase signal indicative of the mirror-down state is detected. However, the starting time of the timer 52 is not limited to this timing. For example, after the mirror-down driving is started, the timer 52 may start measuring time when the motor 35 rotates by a preset angle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-185423, filed on Aug. 20, 2010, which is hereby incorporated by reference herein in its entirety.

What is claimed is:

1. An image pickup apparatus comprising:
   a mirror configured to move between a mirror-down state and a mirror-up state;
   a driver configured to drive the mirror;
   a processing unit configured to provide processing utilizing incident light when the mirror is in the mirror-down state;
   a first timer configured to start measuring a first preset time period when the driver starts driving the mirror in the mirror-up state to the mirror-down state;

a detector configured to detect that the mirror is in the mirror-down state by the driver;

a second timer configured to start measuring a second preset time period when the detector detects that the mirror reaches the mirror-down state; and a controller configured to make the processing unit execute the processing when the first timer finishes measuring the first preset time period and the second timer finishes measuring the second preset time period, wherein the first preset time period is a time period enough to attenuate bounds of the mirror after the mirror in the mirror-up state starts turning to the mirror-down state, when a power-supply voltage of the image pickup apparatus is a first voltage and when the driver starts turning the mirror from the mirror-up state to the mirror-down state, and wherein the second preset time period is a time period enough to attenuate bounds of the mirror after the mirror reaches the mirror-down state, when the power-supply voltage of the image pickup apparatus is a second voltage lower than the first voltage and when the driver starts turning the mirror from the mirror-up state to the mirror-down state.

2. The image pickup apparatus according to claim 1, wherein the processing unit is a focus detector.

3. The image pickup apparatus according to claim 1, wherein the processing unit is a photometric unit.

4. An image pickup apparatus comprising:
a mirror configured to move between a mirror-down state and a mirror-up state;
a driver configured to drive the mirror;
a processing unit configured to provide processing utilizing incident light when the mirror is in the mirror-down state;
a first timer configured to start measuring a first preset time period when the driver starts driving the mirror in the mirror-up state to the mirror-down state;
a detector configured to detect that the mirror is in the mirror-down state by the driver;
a second timer configured to start measuring a second preset time period when the detector detects that the mirror reaches the mirror-down state; and
a controller configured to make the processing unit execute the processing when the first timer finishes measuring the first preset time period and the second timer finishes measuring the second preset time period,
wherein the first preset time period is a time period enough to attenuate bounds of the mirror after the mirror in the mirror-up state starts turning to the mirror-down state, when a temperature of the image pickup apparatus is a first temperature and when the driver starts turning the mirror from the mirror-up state to the mirror-down state, and
wherein the second preset time period is a time period enough to attenuate bounds of the mirror after the mirror reaches the mirror-down state, when the temperature of the image pickup apparatus is a second temperature lower than the first temperature and when the driver starts turning the mirror from the mirror-up state to the mirror-down state.

5. The image pickup apparatus according to claim 4, wherein the processing unit is a focus detector.

6. The image pickup apparatus according to claim 4, wherein the processing unit is a photometric unit.

\* \* \* \* \*